United States Patent
Junell et al.

(10) Patent No.: US 8,059,694 B2
(45) Date of Patent: Nov. 15, 2011

(54) METHOD, APPARATUS AND COMPUTER PROGRAM TO EFFICIENTLY ACQUIRE SIGNALS IN A COGNITIVE RADIO ENVIRONMENT

(75) Inventors: Jari Junell, Espoo (FI); Niko Kiukkonen, Veikkola (FI)

(73) Assignee: Nokia Corporation, Espoo (FI)

( * ) Notice: Subject to any disclaimer, the term of this patent is extended or adjusted under 35 U.S.C. 154(b) by 918 days.

(21) Appl. No.: 12/075,511

(22) Filed: Mar. 11, 2008

(65) Prior Publication Data

US 2009/0232189 A1    Sep. 17, 2009

(51) Int. Cl.
*H04B 1/00*    (2006.01)
*H04L 27/06*    (2006.01)
(52) U.S. Cl. ........................... 375/137; 375/344
(58) Field of Classification Search .......... 375/137, 375/344, 316, 136, 132, 130
See application file for complete search history.

(56) References Cited

U.S. PATENT DOCUMENTS

| | | | |
|---|---|---|---|
| 2004/0047324 A1* | 3/2004 | Diener | 370/338 |
| 2007/0042733 A1 | 2/2007 | Tomioka | 455/179.1 |
| 2008/0024336 A1 | 1/2008 | Park et al. | 341/110 |
| 2008/0139213 A1* | 6/2008 | Coersmeier | 455/450 |
| 2008/0240267 A1* | 10/2008 | Hassan et al. | 375/260 |
| 2009/0103591 A1* | 4/2009 | Chari et al. | 375/136 |
| 2009/0111463 A1* | 4/2009 | Simms et al. | 455/424 |

FOREIGN PATENT DOCUMENTS

| | | |
|---|---|---|
| WO | WO 2006/039800 A1 | 4/2006 |
| WO | WO 2006/120600 A1 | 11/2006 |

OTHER PUBLICATIONS

Laskar, J., et al., "Reconfigurable RFICs and Modules for Cognitive Radio", © 2006 IEEE, pp. 283-286.
Mohmaed Ghozzi et al., "Cognitive Radio: Methods for the Detection of Free Bands", Comptes Rendus Physique, 2006, vol. 7, pp. 794-804, Elsevier, Paris, France.

* cited by examiner

*Primary Examiner* — David Payne
*Assistant Examiner* — Brian J Stevens
(74) *Attorney, Agent, or Firm* — Harrington & Smith (57) ABSTRACT

Signal instances are detected from within a long period of a received radiofrequency RF signal envelope, grouped according to signal level, and periodicities are determined among the grouped signal instances. Periodicity of one of the groups is matched to a known periodicity, and a frequency domain is estimated at a time instance derived from the matched periodicity. If an expected frequency pattern is found that occupies the derived time instance in the estimated frequency domain, then a receiver is synchronized to a candidate signal that lies within the frequency pattern. Then content of the candidate signal is decoded and that content is used to access a cognitive radio system (e.g., register to the system, start the normal operation in the network such as spectrum detection and/or transmission in a traffic channel, etc.).

21 Claims, 5 Drawing Sheets

METHOD, APPARATUS AND COMPUTER PROGRAM TO EFFICIENTLY ACQUIRE SIGNALS IN A COGNITIVE RADIO ENVIRONMENT

TECHNICAL FIELD

The teachings herein relate generally to wireless signal acquisition in a cognitive radio environment, such as for example sensing spectrum that is available for use by a wireless user equipment.

BACKGROUND

The way wireless spectrum is used is changing in the future. The strict allocation of bandwidth to a certain standard will be changed, at least in some frequency bands, to be more flexible. The band, which has been primarily allocated to one wireless standard, might also have other secondary users operating there under certain rules, such as for example that secondary users are not allowed to cause any harmful interference to the primary user. This typically means that the secondary user must detect and avoid the primary users which use the allocated frequency bands. Since it is up to the secondary user to avoid interference and it is seen as impractical for a central node to routinely inform the secondary user which spectrum it might access, the secondary user must be cognizant of the spectrum and is therefore termed herein for brevity as a cognitive user or cognitive radio CR.

CR technology is supposed to implement negotiated or opportunistic spectrum sharing over a wide frequency range covering multiple mobile communication standards, and so the CR link should intelligently detect the usage of a frequency segment in the radio spectrum and jump into any temporarily unused spectrum rapidly without interfering the communication between other authorized (e.g., primary) users. CR technology is promising for the friendly coexistence of the heterogeneous wireless networks, i.e., cellular, wireless Personal Area Network (PAN), wireless Local Area Network (WAN), and wireless Metro Area Network (MAN), etc. In the US, the FCC has encouraged the development of the CR technology for unlicensed operation in the TV broadcasting bands, and CR technology has been adopted as a core feature in the emerging wireless access standards such as the IEEE 802.22-Wireless Regional Area Network (WRAN).

The operation under a primary user (or in a band where there can be several wireless standards with no fixed allocations) means that the CR has to find free (unoccupied) frequencies in three dimensional boundaries: time, frequency and space (for brevity, TFS). The CR has to be aware of the radio environment and change its operation if any of the primary users are occupying the current TFS. The control and maintenance of this kind of system is challenging, and operating on a very wide bandwidth can be a time and power consuming operation.

One consideration addressed herein is how a CR device, when first powered up for the first time in a new location, will find a CR system when the CR device does not have any prior information of the spectrum occupancy/usage in the TFS domains. This is generally termed the so called acquisition problem. Typically, the CR devices may potentially spend vast amounts of time in an acquisition mode, and thus minimizing the power consumption in this mode has substantial implications to the overall power consumption of the CR device. Therefore, in the cognitive radio field a great emphasis has been placed on the spectrum sensing area, i.e. how to find the unused frequency spaces.

One relevant reference for the acquisition problem is by J. Laskar, et al, and entitled "RECONFIGURABLE RFICs AND MODULES FOR COGNITIVE RADIO" (IEEE, SiRF 2006). The Laskar paper asserts that the realization of CR requires two essential features: (i) wideband spectrum sensing, and (ii) frequency-agile operation. In order to find the vacant spectrum available, the CR system can recognize the existence of the signals with meaningful power levels throughout the wide frequency range from tens of MHz to several GHz. Additionally, it should have reliable detection performance with low power consumption for various types of interference signals. The proposal in the Laskar paper does spectrum sensing first by coarse sensing and then by fine sensing in the frequency domain. The coarse-sensing block detects the existence of any meaningful RF signals received by the wideband antenna. Since the impacts of the interferers depend on the signal types and the modulation schemes, Laskar asserts that the identification of the specific signal format is very important for reliable CR link performance. Hence, the fine-sensing block of Laskar further scrutinizes the detected spectrum segment to determine the type of the received interference signal. The resulting spectrum usage status is then reported to the MAC, which processes the reported usage data to allocate the available spectrum for safe CR link.

The Laskar teachings may well be an effective and efficient way to find the spectrum holes that an opportunistic CR can then use, but by the inventors' lights this alone misses an important aspect of the whole CR acquisition problem. Namely, how does a CR device first find the CR system? Once this is done then the CR device can begin its spectrum sensing that finds the free spectrum holes, but as Laskar admits this is a wideband problem. It therefore has the potential to consume excessive power, which is always a consideration in mobile devices. What is needed in the art is a way to find the CR system in the first place, in a manner more power-efficient than simple blind detection over a wideband potential spectrum. Once that is done in an efficient manner, then the terminal in the CR system can take advantage of the already detected spectrum usage and holes and continue to update this information in conjunction with other terminals in CR system.

SUMMARY

According to an embodiment of the invention is a method that includes detecting signal instances from within a long period of a received radiofrequency RF signal envelope, grouping the signal instances according to signal level and determining periodicities among the grouped signal instances. Periodicity of one of the groups is matched to a known periodicity, and a frequency domain is estimated at a time instance derived from the matched periodicity. If an expected frequency pattern is found that occupies the derived time instance in the estimated frequency domain, then a receiver is synchronized to a candidate signal that lies within the frequency pattern. The method then decodes content of the candidate signal and uses that content to access a cognitive radio system (e.g., register to the system, start the normal operation in the network such as spectrum detection and/or transmission in a traffic channel, etc.).

According to another embodiment of the invention is an apparatus that includes one or more signal detectors configured to detect signal instances within a long period of a received radiofrequency RF signal envelope; and a processor that is configured to group the signal instances according to signal level, to determine periodicities among the grouped signal instances, to match a periodicity of one of the groups to a known periodicity, to estimate a frequency domain spectrum at a time instance derived from the matched periodicity, and if an expected frequency pattern is found in the estimated frequency domain that occupies the derived time instance, the processor is configured to synchronize a receiver to a candidate signal that lies within the frequency pattern. The apparatus also includes a receiver that is configured with the processor to decode content of the candidate signal and thereafter based on the decoded content to access a cognitive radio system. In various embodiments, accessing may include registering to the CR system, and/or starting normal operation in the CR network such as by spectrum detection, transmitting in a traffic channel, etc.

According to another embodiment of the invention is a memory embodying a program of machine-readable instructions executable by a digital data processor to perform actions directed toward determining a traffic channel. In this embodiment the actions include detecting signal instances within a long period of a received radiofrequency RF signal envelope, grouping the signal instances according to signal level, determining periodicities among the grouped signal instances and matching one of the groups to a known periodicity. Then the actions include estimating a frequency domain spectrum at a time instance derived from the matched periodicity, and if an expected frequency pattern is found in the estimated frequency domain that occupies the derived time instance, the actions include synchronizing a receiver to a candidate signal that lies within the frequency pattern. Content of the candidate signal is decoded, after which the apparatus accesses a cognitive radio system (e.g., such as by registering to the system and/or starting normal operation in the network such as spectrum detection, transmission in a traffic channel, etc.) based on that decoded content.

According to another embodiment of the invention is an apparatus that includes detecting means, processing means and receiver means. The detecting means is for detecting signal instances within a long period of a received radiofrequency RF signal envelope. The processing means is for grouping the signal instances according to signal level, for determining periodicities among the grouped signal instances, and for matching a periodicity of one of the groups to a known periodicity. The processing means is further for estimating a frequency domain spectrum at a time instance derived from the matched periodicity, and if an expected frequency pattern is found in the estimated frequency domain that occupies the derived time instance, the processor is for synchronizing receiver means to a candidate signal that lies within the frequency pattern. The receiving means with the processing means is further for decoding content of the candidate signal, and based on that decoded content for accessing a cognitive radio system. In an embodiment, accessing the CR system could be embodied as registering to the CR system, engaging in spectrum detection for the CR system, determining a traffic channel for the CR system and transmitting on that traffic channel, and the like. In a particular embodiment, the detecting means includes one or more signal detectors, where if there are more than one they are in parallel with one another; the processing means includes a microprocessor; and the receiving means includes a receiver.

These and other aspects are detailed below with particularity.

BRIEF DESCRIPTION OF THE DRAWINGS

The foregoing and other aspects of these teachings are made more evident in the following Detailed Description, when read in conjunction with the attached Drawing Figures.

DETAILED DESCRIPTION

As noted above, the pre-existing literature in this area has concentrated on spectrum sensing, but in the opinion of the inventors this assumes away an initial problem of how to first discover the CR spectrum that may then yield the frequency holes for use.

It is expected that the CR system to which the CR device seeks entry sends broadcasting information of various types, from which the CR devices can find relevant information for maintaining their connection, establishing/re-establishing themselves to the CR system, and registering to the CR system. Many existing cellular systems use a fixed channel to broadcast this synchronization and control information to their primary users. The most challenging case for CR system acquisition is seen to be where this broadcast information is over a frequency hopped channel. In many cases other devices nearby to the CR device seeking first access already have the spectrum usage information and can transmit this information instead of a dedicated base station or access point broadcasting it (as system information for example). Such transmission by users is also considered herein as a broadcasting channel, as it makes no difference to the CR device that seeks to find the spectrum from where the broadcasts originate. The repetition interval for the broadcasting channel can be quite long and the time during which the broadcasting channel is active within the frame can be very short (<1% of the frame) to minimize the on-time used to monitor that broadcast channel by the battery operated devices. The task for the newcomer CR is to find this channel, synchronize to it and decode the content after which it can start to communicate with other devices in the same network.

The solution to the problem of minimizing the power consumption when trying to find the (rarely) existing but repetitive "broadcasting" channel is to detect a longer period of the received envelope of the spectrum area under study and trying to find either suitable time symbol/frame lengths or other such periodicities of the "broadcasting" channel. This detection, which can take quite a long time, requires only a minimal amount of hardware (RF front end, detector(s), comparators, some digital logic and memory). After the analysis of the results the most promising time instants will be investigated by the main receiver to identify the frequency and time instances where the signal is present. This can require several detections if the receiver is not able to also decode the signal from the wide spectrum range under study and the broadcasting channel is hopping. In this case, if the content of the broadcasting channel has not been detected before the identification of the hopping sequence, the data receiver will receive the channel from the frequency of the next predicted frequency according to the hopping sequence or if not successful (that frequency changed because of primary signal occupancy) at the next frequency and time instant in the hopping sequence.

To find a broadcasting signal by frequency domain spectrum sensing function is a very power hungry operation because time-wise such a broadcasting signal is rare, in RF terms of time (e.g., 1% of the frame time as noted above, for example). This generally would require a full receiver with the whole analog chain and digital processing to be turned on for long periods of time. So there is an opportunity for substantial power savings if the CR device can study the available spectrum without the entire analog and digital receiver chains being fully powered the whole time. One practical consideration is that, if the band under study has several higher level signals at the CR device location as compared to the signals for the network the CR device seeks to access, they can mask the signals of the CR device's wanted network (e.g., at the CR device some signals from one or more primary networks obscure some signals from the wanted CR network).

Figure 1:
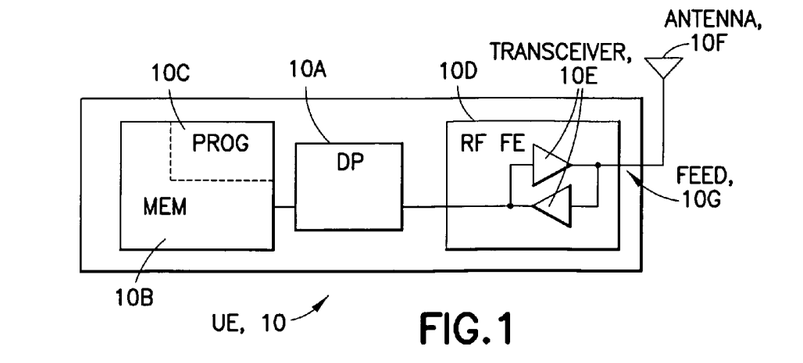
FIG. 1 shows a simplified block diagram of an electronic apparatus that is suitable for use in practicing the exemplary embodiments of this invention.

Reference is now made to FIG. 1 for illustrating a simplified block diagram of an electronic CR device 10 that is suitable for use in practicing the exemplary embodiments of this invention. In FIG. 1 a wireless network (not shown) is adapted for communication with other devices, and the CR device 10 is initially unaware of the specifics of that network (e.g., a cellular network uses a user equipment and a Node B for example). The CR device 10 includes a data processor (DP) 10A, a memory (MEM) 10B that stores a program (PROG) 10C, and a suitable radio frequency (RF) transceiver 10E (transmitter and receiver) that is functionally distinct from a radiofrequency front-end circuit RF FE 10D. The transceiver 10E is coupled through the RF FE 10D to one or more antennas 10F (one shown) via a feed 10G of the RF FE 10D for wireless communications over one or more wireless links with one or more elements of the wireless network. During the acquisition stage this link may be considered downlink only (e.g., receiving the broadcast channel) and once acquired and holes are discovered the link may then become bi-directional.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

At least the PROG 10C is assumed to include program instructions that, when executed by the associated DP, enable the electronic device to operate in accordance with the exemplary embodiments of this invention, as detailed above. Inherent in the DP 10A is a clock to enable synchronism among the CR device 10 and the elements of the network(s) that it seeks to acquire, for transmissions and receptions within the appropriate time intervals and slots required as may be the case for the specific network in question. The PROG 10C may be embodied in software, firmware and/or hardware, as is appropriate. In general, the exemplary embodiments of this invention may be implemented by computer software stored in the MEM 10B and executable by the DP 10A of the CR device 10, or by hardware, or by a combination of software and/or firmware and hardware in the CR device 10.

In general, the various embodiments of the CR device 10 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. Handheld portable CR devices may be generically termed user equipment UE.

The MEM 10B may be of any type suitable to the local technical environment and may be implemented using any suitable data storage technology, such as semiconductor-based memory devices, magnetic memory devices and systems, optical memory devices and systems, fixed memory and removable memory. The DP 10A may be of any type suitable to the local technical environment, and may include one or more of general purpose computers, special purpose computers, microprocessors, digital signal processors (DSPs) and processors based on a multi-core processor architecture, as non-limiting examples. The RF FE 10D may also incorporate a microprocessor separate and distinct from any main processor.

As noted above, the acquisition of the cognitive radio signal is challenging because of its nature; it can be located basically in a very wide frequency band, there are not allocated any clear frequencies e.g. to broadcasting type signals. In a worst case the acquisition process can take very long time or even be unsuccessful and this process can take a lot of power. Also as noted above, an important constraint is to minimize the power consumption within the CR device 10. These teachings acquire the signal in what may be generally regarded as two phases. The first phase is to detect a longer period of the received envelope of the current spectrum area and possible periodicities. The longer period can be selected as a multiple of the frame length for the wanted CR system (or of any other system known to be in operation at the location of the CR device). This longer period enables the CR device to find periodicities despite some broadcasts from the wanted CR system being obscured by signals from other systems that are sent at a period different than the wanted system broadcasts. After the analysis of the first phase results the second phase makes feature detection or spectrum estimation to the most promising parts in frequency domain at time instants specified by the results of the first phase. The first phase can take e.g. 1 second (generally 1.0 sec.+/−0.5 sec) and the snaps shots in the second phase are of the order of 1 millisecond (1.0 msec+/−0.5 msec).

Substantial power savings arise because during the first phase only the RF front end 10D (as opposed to the transceiver 10E) needs to be powered, including detector(s), threshold(s) and relevant digital components. Reference in this regard may be seen at FIG. 2. The signal received at the antenna 10F passes through a passband filter 22 pass only the wideband signal of interest and a (first) low noise amplifier 24A as is known in the art. The main receiver 34 is shown but is not processing the signal in this first phase; it is operating in a low power mode or even a fully depowered state and performs no signal processing. In this first phase the signal is analyzed only within the RF FE 10D, in which there are one or more envelope detectors 26A, 26B in parallel operating at different portions (signal levels, see FIG. 3) of the passed wideband signal. In this manner the envelope detectors are covering the full dynamic range from noise floor up to the maximum expected reception level. The received signal instances are split into multiple signal level (amplitude) ranges, each range represented by one detector 26A, 26B that detects whether or not there is a signal within its signal level range. The number of signal detectors 26A, 26B (there can be as few as one) depends on the received dynamic range (e.g., the wider the bandwidth, the more probable that there are high level signals). As an example, if the noise floor is about −85 dBm and the maximum expected level about −5 dBm at the low noise amplifier (LNA) input and one detector can cover about 40 dB range, then two detectors are required to cover the 80 dB [−5-(−85) dynamic range]. One or more additional low noise amplifiers 24B may also be imposed to further amplify the received signal and therefore shift it to next signal level range not been covered by the preceding detector. Consider the first detector 26A. It covers the highest signal level range. The envelope of the received signal at the output of detector 26A goes to the comparators 28. The comparators 28 have different thresholds for signal envelope amplitudes, see FIG. 3. All the comparators, which threshold is exceeded by the signal envelope, gives "1" as an output bit, otherwise it gives "0". The whole output from the bank of comparators is a digital word, where there are a sequence of 1 s until the signal level does not anymore exceed the threshold and the rest of the word is a sequence of 0 s. This information is connected to the logic, which detects a change in the word and triggers the output in the memory command including the word and the relevant time stamp. The threshold detectors 28, 30 (comparators) output to a memory 32 which also has decision logic as detailed below, which in the schematic diagram of FIG. 1 may be the DP 10A and the MEM 10B, components of which may or may not be physically disposed on the RF FE 10D circuit chip. Similar hardware is shown in relation to the other envelope detector 28B at FIG. 2.

The memory needed for the first phase (at block 32 of FIG. 2 or 10B of FIG. 1) is only for data related to transition moments across the signal level thresholds with low resolution and with the relevant time stamp. In the second phase, the signal is sampled for the whole sampling period with a high clock rate and high resolution (though a one-bit solution might be possible if not trying to decode the data also). The sampling period in the first phase has to be at least as long as the longest expected gap in between transmissions of the searched CR system at that band.

Figure 3:
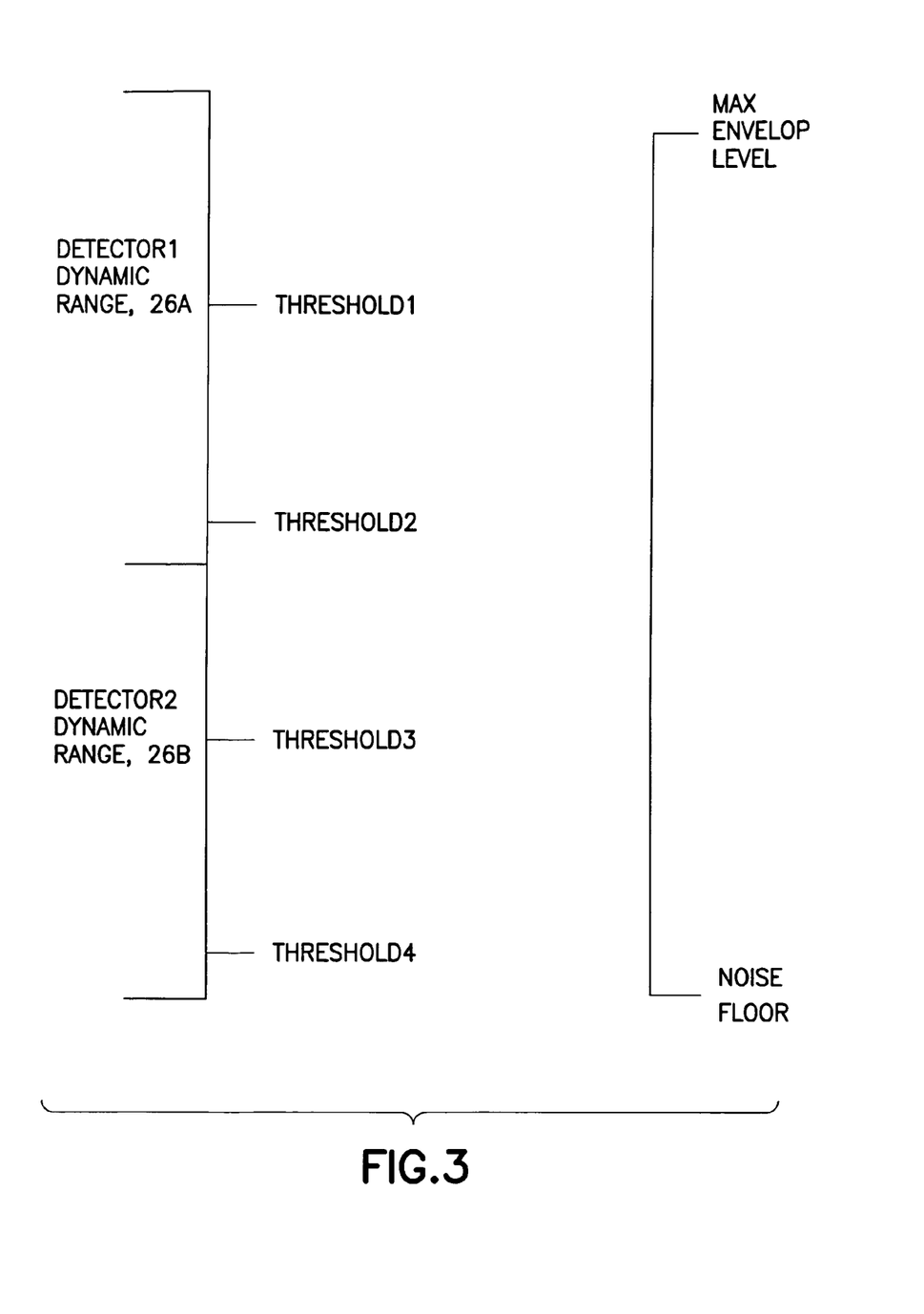
FIG. 3 is a conceptual diagram showing a relationship between detectors, signal thresholds and envelope dynamic range according to one specific implementation of the invention.
Figure 4:
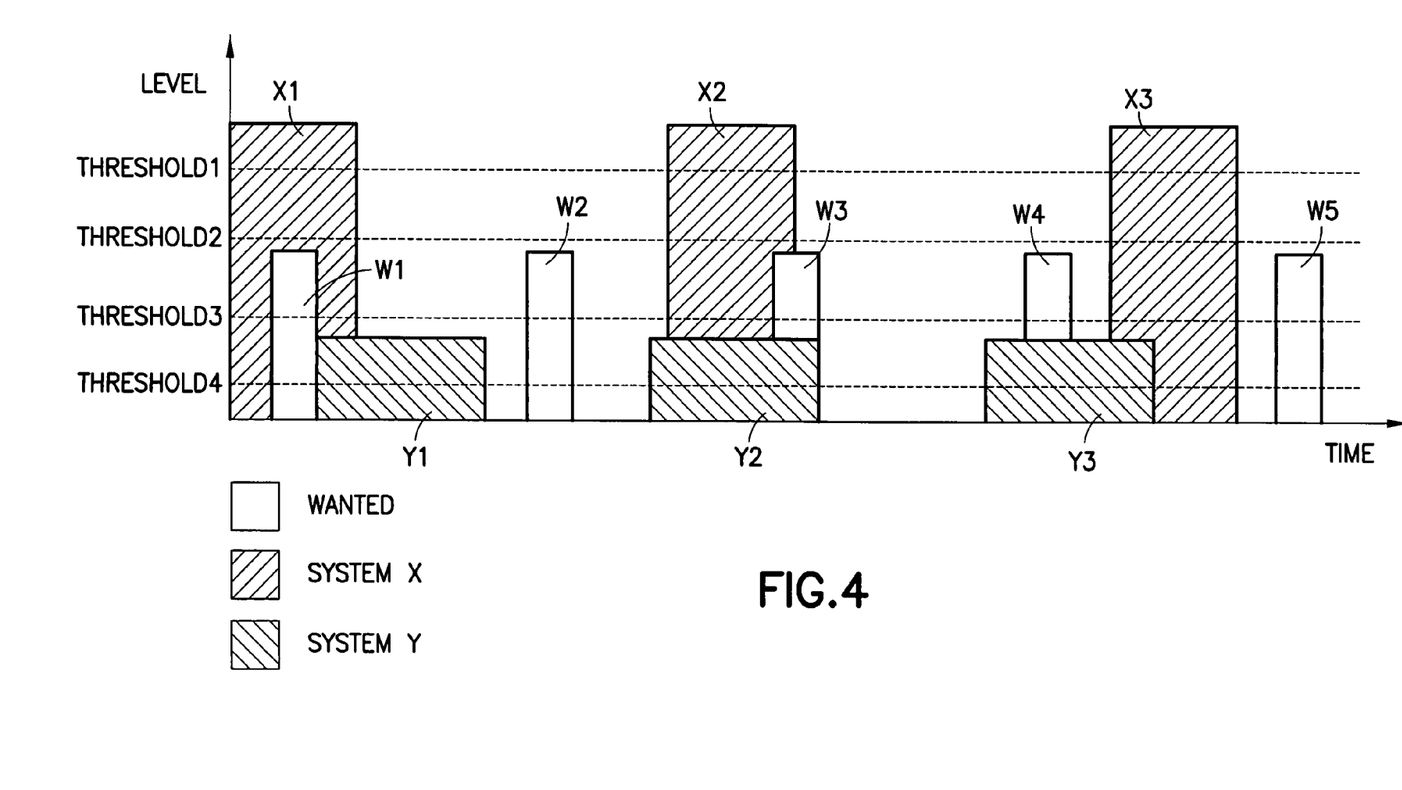
FIG. 4 is a timing diagram showing in the time domain three different systems of the band under study according to an embodiment of the invention.

The CR device 10 collects information of time instants when the received waveform passes across the thresholds (comparators 28, 30), and stores in memory either the word made from the output of the comparators or the highest threshold for that time instant that still lies within the waveform envelope. These alternatives are implementation details that are not limiting to the broader aspects of the invention. One particular solution for relationships between envelope detectors, thresholds of the comparators, and envelope dynamic range is shown at FIGS. 3-4. At the right side of FIG. 3 is the wideband signal passed by the passband filter 22 within which the CR device 10 seeks to acquire a signal. This shows the signal envelope. As seen at the left side of FIG. 3, the first envelope detector 26A and the second envelope detector 28B operate in respective higher and lower dynamic ranges. There are comparators associated with each of those two envelope detectors, each at a different dynamic range part: thresholds 1 and 2 of FIGS. 3-4 correspond to comparators 28 of FIG. 2, and thresholds 3 and 4 of FIGS. 3-4 correspond to comparators 30 of FIG. 2.

So the thresholds for the detected envelope and the time instants associated with those threshold changes are stored in the memory of the CR device 10. From this stored information is determined the information shown in chart form at FIG. 4, still within the first phase noted above with minimal power consumption. FIG. 4 shows signal from three different systems, where the x-axis is time and y-axis is the level of the total envelope detected from the band received. The figure does not give any bandwidth information of the signal. As an illustrative purposes each system's signal is shown by different shading. The real output is the sum of these signals digitized by the thresholds. Only the moments, when the sum of the signals passes through the threshold, are put to the memory with the corresponding time stamp.

There are different cases when trying to find the CR device's wanted network signal (the lightest shading in FIG. 4). This can be very dependent on the bandwidth; the wider the bandwidth the more probable that there are more transmissions on simultaneously. Three possible cases are outlined with reference to FIG. 4. First, the wanted network signal length and repetition period are detected. There are two variations to this: the level of the wanted network signal is higher than other signals at the same time, such as signal W4 is higher than Y3; or there are not other signals on simultaneously in time domain such as signals W2 and W5. So for signals W4 and W5 the correct repetition period is found and for signals W2 and W4 the repetition period is twice the searched one. There can be both broadcasting type and data transfer type signals. They can have different packet and repetition lengths. There can be also several broadcasting signals detected having the same repetition period but different time offset in transmission. All of these are within the first case.

In a second case, the length of the wanted network signal is detected (such as at W2, W4 and W5), and other ones or some of the wanted network signals are masked by other systems such as shown at signal W3 which is partially obscured by signal X2. In a third case, signals from other systems might have masked the CR device's own network signal totally such as seen at FIG. 4 where signal X1 fully masks signal W1. The CR device does not know if a signal from its wanted network exists there or if it is masked by another system's signal in that position and band (spatial/frequency/time domains). FIG. 4 also makes clear that the number of threshold detectors gives greater granularity to the available information; using only the four thresholds of FIG. 3 (plus a peak threshold detector) would place the system X signals at the peak threshold, those of system Y at threshold 3, and those of the wanted system at threshold 2. They are plotted in FIG. 4 to fall between thresholds to illustrate this granularity improvement.

From the above phase 1 aspect of the invention, then there are selected one or more candidate time periods. The receiver is powered up and those candidate time bounds are evaluated using signal processing of a received signal to detect features and see if in fact it is a channel on the wanted network. As can be seen, the majority of the work in reducing the scope of the receivers search for the wanted network lied within the first phase, and that is exactly where minimal power consumption takes place.

An exemplary algorithm for the time domain estimation can then be broken into two major components for phase 1: sensing and collecting the transitions, and analyzing those collected transitions for periodicities of the wanted system. These are detailed with respect to FIG. 5. In transition collection, the RF FE detects and stores at block 502 the transition moments as 1) a threshold number which is the highest above which the signal is, and 2) the time instant when this transition has happened.

Figure 5:
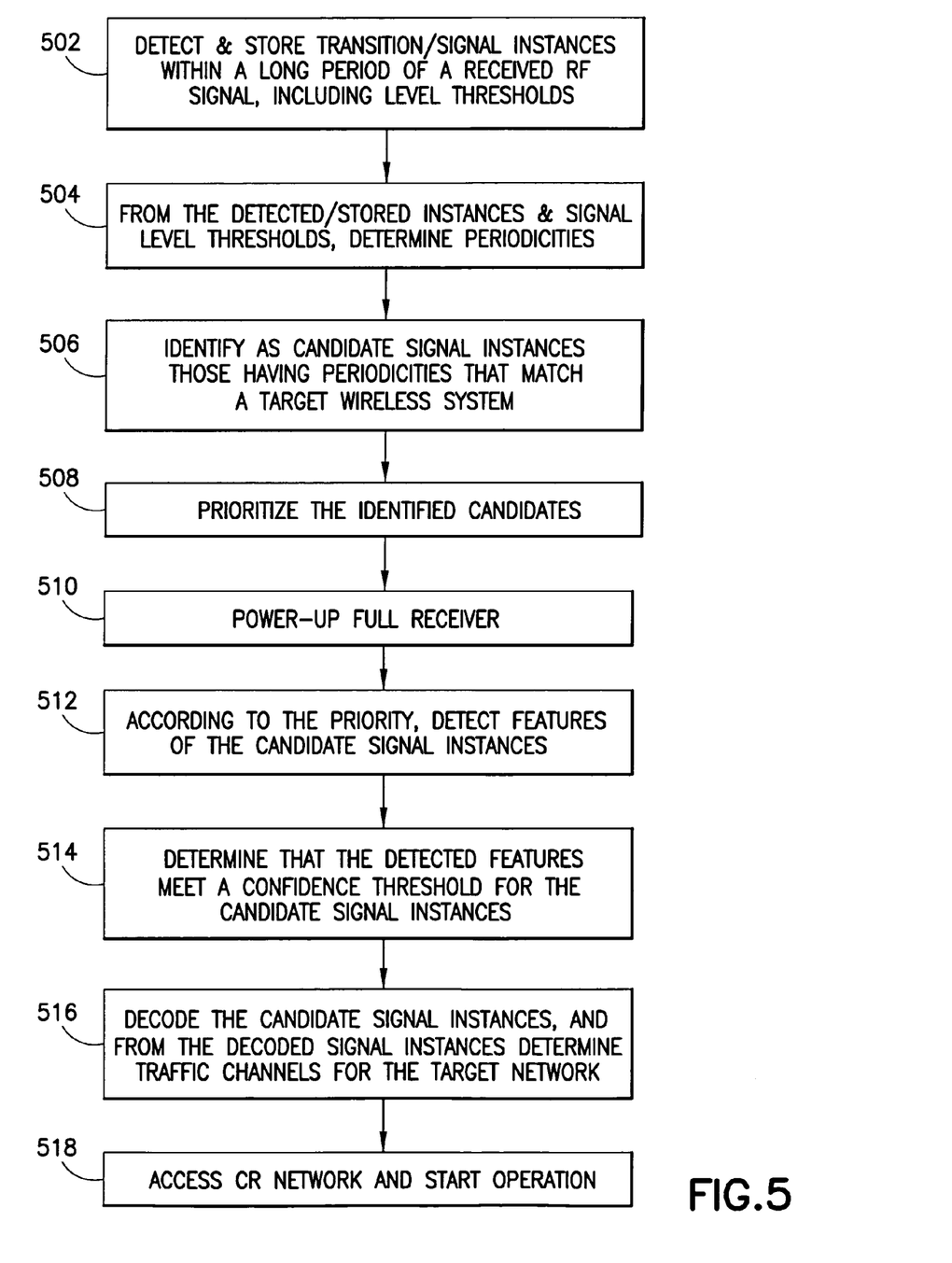
FIG. 5 is a process flow diagram illustrating an exemplary algorithm according to an embodiment of the invention.

In the analysis of the RF FE results by the DP or microprocessor, the transitions are scanned and periodicities are determined at block 504, and periods of time which matches to the wanted or target wireless cognitive radio system are identified at block 506. It might be that the data string is formed from the several symbols/bursts. Then very short transitions down and up can be ignored (but this information can be used to identify the burst lengths and their match to the CR system). For the suitable periods of time that are found, then look to see if their repetition period (or multiple of it) matches with the CR system, and also at block 508 see if there are different levels of suitable candidates (prioritizing for the power-hungry signal processing at the powered-up receiver). If there are not found any suitable time periods, but there is activity found in that band, then 1) locate the thresholds between which the envelope is most of the time, 2) zoom the receiver there as detailed below, and 3) repeat the transition collection and signal analysis. If there are still not found any suitable periods, then another option is detailed below. For phase 2, choose for the first candidate of block 512 the one which has the highest level (next transmission time can be calculated from the time this was received and from the knowledge of the repetition of this frame in our CR system). If there is no (appreciable) difference in the levels but different candidates have different repetition times, then choose the candidate with best match to the CR system frame repetition rate (most candidates for that).

One can take another time domain reception if the results are promising, but more accuracy will likely be needed. This situation occurs when there are longer periods of envelope between thresholds of two comparators. The signal detector and comparator entities can be tuned so that the gain before the detectors (the other low noise amplifier 24B of FIG. 2) is adjustable optimally to the area where the envelope has mainly been, and the thresholds of the comparators are adjusted to make a finer grid. After that the procedure follows the above example algorithm.

The next step in the first case is to find the position of the wanted signal in the frequency domain and to detect the features at block 512 and decode the signal at block 516 to obtain the content of the "broadcasting" signal to be able to read the frequency list and to be synchronized to the wanted system. The basic method for that is spectrum sensing by some kind of feature detection (block 514). There are methods which can locate the signal within the spectrum by detecting a certain feature of that signal. At this stage the whole spectrum sensing receiver is turned on at block 510. Some confidence level in the feature detection may be imposed at block 514 before actual decoding of the signal. The end result is that the CR device 10 accesses the CR system successfully at block 518 on one of the channels decoded from the broadcast channel, assuming that the process of FIG. 5 was successful and the candidate for which the features were detected was in fact the broadcast channel.

But this leaves certain challenges. Even though the repetition period is detected, the signal might hop. The information of the last frequency does not help to know the frequency of the next frequency in the hopping sequence. Also, detecting the last transmission frequency might not make it possible to read the content of the signal (e.g., resolution of the wideband spectrum might not enable to detect the own signal content in narrow band even when optimizing the automatic gain control AGC from the first phase information).

However, broadcasting and data transmission signals might have different features used for spectrum sensing detection. If the broadcasting signal is hopping, the number of frequencies in hopping is quite limited. The hopping sequence can then be detected by measuring the frequencies at each transmission moment and when it starts to repeat itself the data receiver can predict the next position and adjust itself before the next transmission.

Now is described an exemplary approach to detect frequency hopped broadcast channels. If with a reasonable probability we can recognize the wanted system signal from the envelope analysis (see FIG. 4), then set the AGC and sampling time according to the next predicted time instant of the wanted signal and sample the received signal (this will be wideband sampling). Estimate the position in-band by feature detection or by standard spectrum analysis measurement (where only bandwidth information is available, so the expected wanted network signal SNR>10 dB for example). If the wanted network signal is found, then filter that wanted signal from others and decode the content. If decoding is not possible (and the signal of the wanted system is hopping), then estimate the positions in-band as long as the signals starts to repeat itself. Then use the data receiver at the correct time and frequency to decode the signal.

The resolution of the ADC of the spectrum sensing receiver can be from 1 bit (decoding not possible) to almost 10 bit depending on the bandwidth and the final target of this receiver.

Two options are explored for the case where no sign of the wanted signal is found from the envelope analysis. The first option is to use the information of periods when there is something else other than noise (if periodic) and predict the next time to make the feature detection with an optimized AGC setting as above. The second option is to use a threshold detector to detect the moment when the associated threshold is exceeded and then immediately start sampling for a predetermined period of time and use feature detection to that data to find if there is any sign of the wanted network's signal. If not found, repeat for a set number of iterations or a set amount of time. If found, then continue as detailed above (broadcasting period is known, feature detection at those times if data decoding is not possible, frequency hopping sequence discovered and data decoding by data receiver afterwards).

There are three possible outputs from the acquisition process: either the CR network is found (and terminal will join that network); or the CR network is not found and the spectrum has not been frequently occupied by high level signals (high probability that there is not any CR network); or the spectrum has been frequently occupied by high level signals (high uncertainty that there is not any CR network). If the CR device 10 does not find the wanted signal, there are two ways forward: try another frequency band, or stay at the current band and use spectrum sensing to find white (all noise or noiseless) spectrum and thereafter start CR transmissions to advertise the existence of the CR device according to the rules of the CR system.

Figure 2:
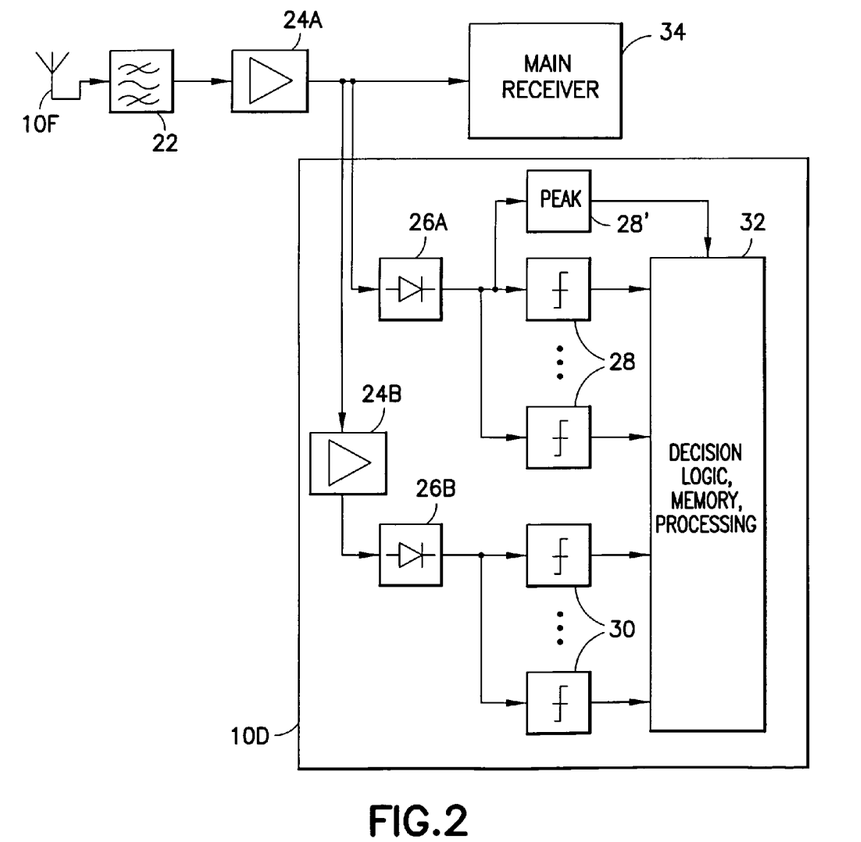
FIG. 2 is a block diagram showing detail of the RF front end module of FIG. 1 for envelope detection according to an embodiment of the invention.
Figure 6:
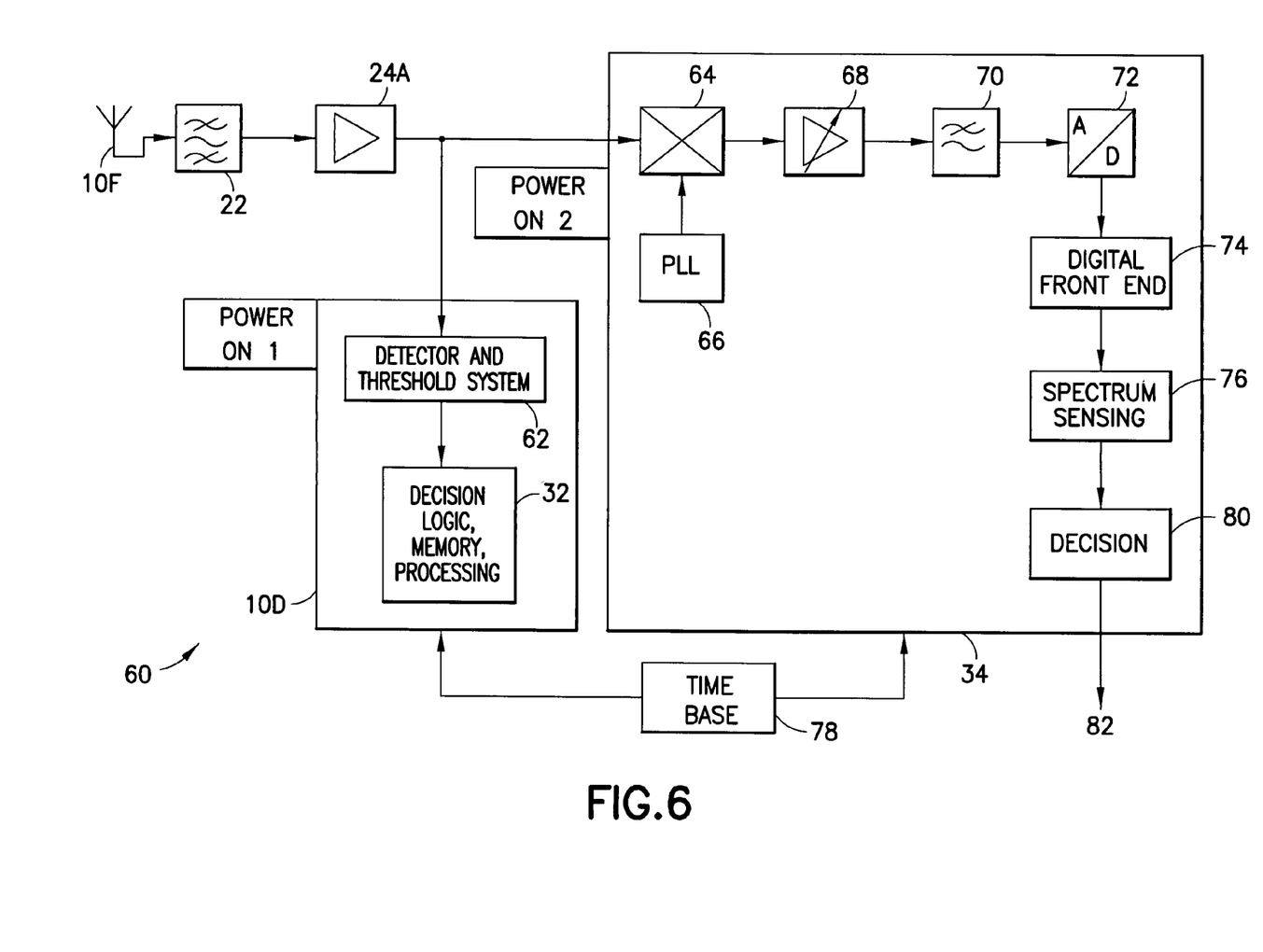
FIG. 6 is a schematic diagram of a spectrum sensing receiver according to an embodiment of the invention.

FIG. 6 is a schematic diagram example of a spectrum sensing receiver 60 showing more detail than that of FIG. 2. There are two sections which have different power on times. The first power-on block 10D is similar to that shown in FIG. 2 and operates in the first phase, doing the time domain analysis. The second power on block 34 is the full receiver of FIG. 2 and operates in the second phase for frequency domain analysis of the received signal (with time base information) in the actual signal acquisition process. The antenna 10F, passband filter 22 and low noise amplifier 24A are as detailed with respect to FIG. 2. The detector and threshold system 62 includes the hardware shown in FIG. 2 as the envelope detectors and comparators with threshold. The first power-on block 10D may be powered at all times during phase one and phase two, but the second power-on block 34 is fully powered only during phase two. The two blocks are synchronized to a clock 78, which serves as the time base from which the periodicities are determined.

The second power-on block 34 operates on the candidate time instants of the received signals and includes a mixer 64 that adjusts the received signals from the antenna 10F that are identified by the decision logic 32 of the first power-on block as candidate instants. A variable amplifier 68 and filter 70 pass the candidate signal to an analog to digital converter 72 and the digital FE 74 moves the signal to a spectrum sensing block 76 that performs the feature extraction/recognition or other signal processing detailed above. A decision is made at processor block 80 whether or not the candidate signal is within the wanted network, and particularly in an embodiment whether or not the candidate signal represents a broadcast channel of the wanted network. If yes, then the candidate signal is output at 82 for decoding, after which the CR device is able to access the CR network. After accessing the network CR device 10 can start normal operation in the network also looking for new spectrum holes in which the CR network might operate. It is at that point that the teachings of the Laskar paper may then be employed in order to find those specific holes that the CR device 10 can opportunistically use.

Embodiments of this invention may be implemented by computer software executable by a data processor of a portable wireless device such as the processor 10A shown for the CR device 10, or by hardware, or by a combination of software and hardware. Further in this regard it should be noted that the various logical step descriptions above may represent program steps, or interconnected logic circuits, blocks and functions, or a combination of program steps and logic circuits, blocks and functions.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the ensuing claims.

We claim:

1. A method comprising:
   detecting signal instances from within a received radiofrequency RF signal envelope;
   grouping the signal instances according to signal level;
   determining periodicities among the grouped signal instances;
   matching a periodicity of one of the groups of signal instances to a known periodicity, wherein matching the periodicity comprises finding a position of a wanted signal in the frequency domain using the determined periodicities as time domain results and detecting features of the wanted signal in the frequency domain with a receiver powered on;
   estimating a frequency domain spectrum at a time instance derived from the matched periodicity;
   if an expected frequency pattern that occupies the derived time instance is found in the estimated frequency domain spectrum, synchronizing to a candidate signal that lies within the frequency pattern; and
   decoding content of the candidate signal and thereafter accessing a cognitive radio system based on the decoded content.

2. The method of claim 1, wherein the detecting, grouping, determining and matching comprise a first phase of the method that is executed over a substantially longer time period than a second phase which includes the estimating, synchronizing and decoding.

3. The method of claim 1, wherein a sampling period for detecting the signal instances is configured to be at least as long as a longest gap between the determined periodicities.

4. The method of claim 1, wherein the periodicities comprise symbol or frame repetition patterns in at least two different wireless systems.

5. The method of claim 1, wherein determining the periodicities further comprises determining signal levels of the detected signal instances.

6. The method of claim 1, wherein accessing the cognitive radio system comprises decoding a broadcast channel to determine traffic channel frequencies and transmitting on at least one of the determined traffic channel frequencies.

7. The method of claim 1, wherein the known periodicity is a periodicity of a broadcast channel or a regularly repeating pattern of known length of a target wireless network.

8. The method of claim 1, wherein at least one of the groups is determined by:
   measuring a frequency at each transition moment at which the detected signals change among hop frequencies;
   determining a frequency hopping sequence from a repeat pattern of the transition moments; and predicting a next transition moment from the repeat pattern.

9. The method of claim 1, wherein matching the periodicity comprises:
locating thresholds between which RF activity exists for a majority of the time within the RF envelope; and
tuning a bank of detectors for the located thresholds.

10. A method comprising:
detecting signal instances from within a received radiofrequency RF signal envelope, wherein detecting the signal instances is by a plurality of detectors in parallel that detect signal levels across the entire RF signal envelope and a plurality of comparators each having a threshold for a unique signal level such that an output of the plurality of comparators is a digital word which is stored in a local memory for determining the periodicities;
grouping the signal instances according to signal level;
determining periodicities among the grouped signal instances;
matching a periodicity of one of the groups of signal instances to a known periodicity;
estimating a frequency domain spectrum at a time instance derived from the matched periodicity;
if an expected frequency pattern that occupies the derived time instance is found in the estimated frequency domain spectrum, synchronizing to a candidate signal that lies within the frequency pattern; and
decoding content of the candidate signal and thereafter accessing a cognitive radio system based on the decoded content.

11. An apparatus comprising:
at least one signal detector configured to detect signal instances within a received radiofrequency RF signal envelope;
coupled to an output of each of the at least one signal detector, at least two comparators coupled in parallel to one another;
a processor configured to:
group the signal instances according to signal level,
determine periodicities among the grouped signal instances, where the periodicities comprise symbol or frame repetition patterns within thresholds set by the at least one signal level detector in at least two different wireless systems,
match a periodicity of one of the grouped signal instances to a known periodicity,
estimate a frequency domain spectrum at a time instance derived from the matched periodicity,
and if an expected frequency pattern is found in the estimated frequency domain that occupies the derived time instance the processor is configured to synchronize a receiver of the apparatus to a candidate signal that lies within the frequency pattern; and
the receiver is configured, with the processor, to decode content of the candidate signal and to access a cognitive radio system based on the decoded content.

12. The apparatus of claim 11, wherein the at least one signal detector and the processor are configured to detect and group the signal instances, determine the periodicities, and match the periodicity over a substantially longer period than the receiver and processor estimates the frequency domain, synchronizes to the candidate signal and decodes the content.

13. The apparatus of claim 11, wherein the receiver is in a low power consumption mode or off while the at least one signal detector and the processor detect and group the signal instances, determine the periodicities and match the periodicity; and the receiver is powered up for estimating the frequency domain spectrum and decoding the content after the candidate signal is identified.

14. The apparatus of claim 11, wherein the processor is configured to set a sampling period for the at least one signal detector to detect the signal instances that is at least as long as a longest gap between the determined periodicities.

15. The apparatus of claim 11, wherein the at least one signal detector is configured to detect signals across the entire RF signal envelope, the at least two comparators each have a threshold for a unique signal level, and the at least two comparators are arranged in combination to output a digital word that is stored in a memory of the apparatus from which the processor determines the periodicities.

16. The apparatus of claim 11, wherein the processor is configured to determine the periodicities without signal decoding information from the receiver.

17. The apparatus of claim 12, wherein the processor is configured to access the cognitive radio system by causing a transmitter of the apparatus to transmit on a traffic channel that is determined from decoding the candidate signal, wherein the decoded signal is received over a broadcast channel of the cognitive radio system.

18. The apparatus of claim 11, wherein the known periodicity is a periodicity of a broadcast channel or a regularly repeating pattern of known length of a target wireless network.

19. The apparatus of claim 11, further comprising a transmitter configured to transmit on a traffic channel determined from decoding the candidate signal.

20. The apparatus of claim 11, wherein the processor is configured to arrange the signal instances into at least one of the groups by:
measuring a frequency at each transition moment at which the detected signal instances change among hop frequencies;
determining a frequency hopping sequence from a repeat pattern of the transition moments; and
predicting a next transition moment from the repeat pattern.

21. A memory embodying a program of machine-readable instructions executable by a digital data processor to perform actions directed toward determining a traffic channel, the actions comprising:
detecting signal instances within a received radiofrequency RF signal envelope;
grouping the signal instances according to signal level;
determining periodicities among the grouped signal instances;
matching a periodicity of one of the groups of signal instances to a known periodicity, wherein matching the periodicity comprises finding a position of a wanted signal in the frequency domain using the determined periodicities as time domain results and detecting features of the wanted signal in the frequency domain with a receiver powered on;
estimating a frequency domain spectrum at a time instance derived from the matched periodicity;
if an expected frequency pattern that occupies the derived time instance is found in the estimated frequency domain spectrum, synchronizing to a candidate signal that lies within the frequency pattern; and
decoding content of the candidate signal and thereafter accessing a cognitive radio system based on the decoded content.

* * * * *